US007466472B2

(12) United States Patent
Kawai

(10) Patent No.: US 7,466,472 B2
(45) Date of Patent: Dec. 16, 2008

(54) IMAGE FORMING APPARATUS, IMAGE FORMING METHOD, PROGRAM AND COMPUTER READABLE INFORMATION RECORDING MEDIUM

(75) Inventor: Yoshiaki Kawai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 381 days.

(21) Appl. No.: 11/335,621

(22) Filed: Jan. 20, 2006

(65) Prior Publication Data

US 2006/0181753 A1 Aug. 17, 2006

(30) Foreign Application Priority Data

Jan. 24, 2005 (JP) ............................ 2005-016153
Jan. 10, 2006 (JP) ............................ 2006-002651

(51) Int. Cl.
*G02F 1/03* (2006.01)
*G02B 26/08* (2006.01)

(52) U.S. Cl. ...................................... 359/264; 359/205

(58) Field of Classification Search ................ 359/264, 359/205

See application file for complete search history.

(56) References Cited

U.S. PATENT DOCUMENTS

| | | | | |
|---|---|---|---|---|
| 6,466,247 | B1 * | 10/2002 | Sugano et al. | 347/250 |
| 2005/0007440 | A1 * | 1/2005 | Nishikawa | 347/232 |
| 2005/0184229 | A1 * | 8/2005 | Maeda | 250/234 |
| 2006/0139433 | A1 * | 6/2006 | Yoshida | 347/116 |

FOREIGN PATENT DOCUMENTS

| | | | |
|---|---|---|---|
| JP | 2000-112205 | | 4/2000 |
| JP | 2002-160399 | | 6/2002 |
| JP | 2004-181833 | | 7/2004 |
| JP | 2004-237623 | | 8/2004 |
| JP | 2005-002621 | * | 1/2005 |

* cited by examiner

*Primary Examiner*—Jordan M. Schwartz
*Assistant Examiner*—James C Jones
(74) *Attorney, Agent, or Firm*—Harness, Dickey & Pierce PLC

(57) ABSTRACT

Upon predetermined mark image measurement, the timing signal is adjusted to obtain a required correction amount for a scan magnification of the modulated light in a measurement range of the predetermined mark image measurement, while, upon regular image forming operation, the timing signal is adjusted to obtain the required correction amount for the scan magnification of the modulated light in the entire scanning range of the modulated light for regular image forming operation.

11 Claims, 15 Drawing Sheets

5
34
31y
32y
33y
31m
32m
35ym
36m
36y
39ym
40ym
37ym
38ym
SCANNING DIRECTION
31bk
32bk
33bk
31c
32c
35bkc
36c
36bk
37bkc
38bkc
39bkc
40bkc
SCANNING DIRECTION

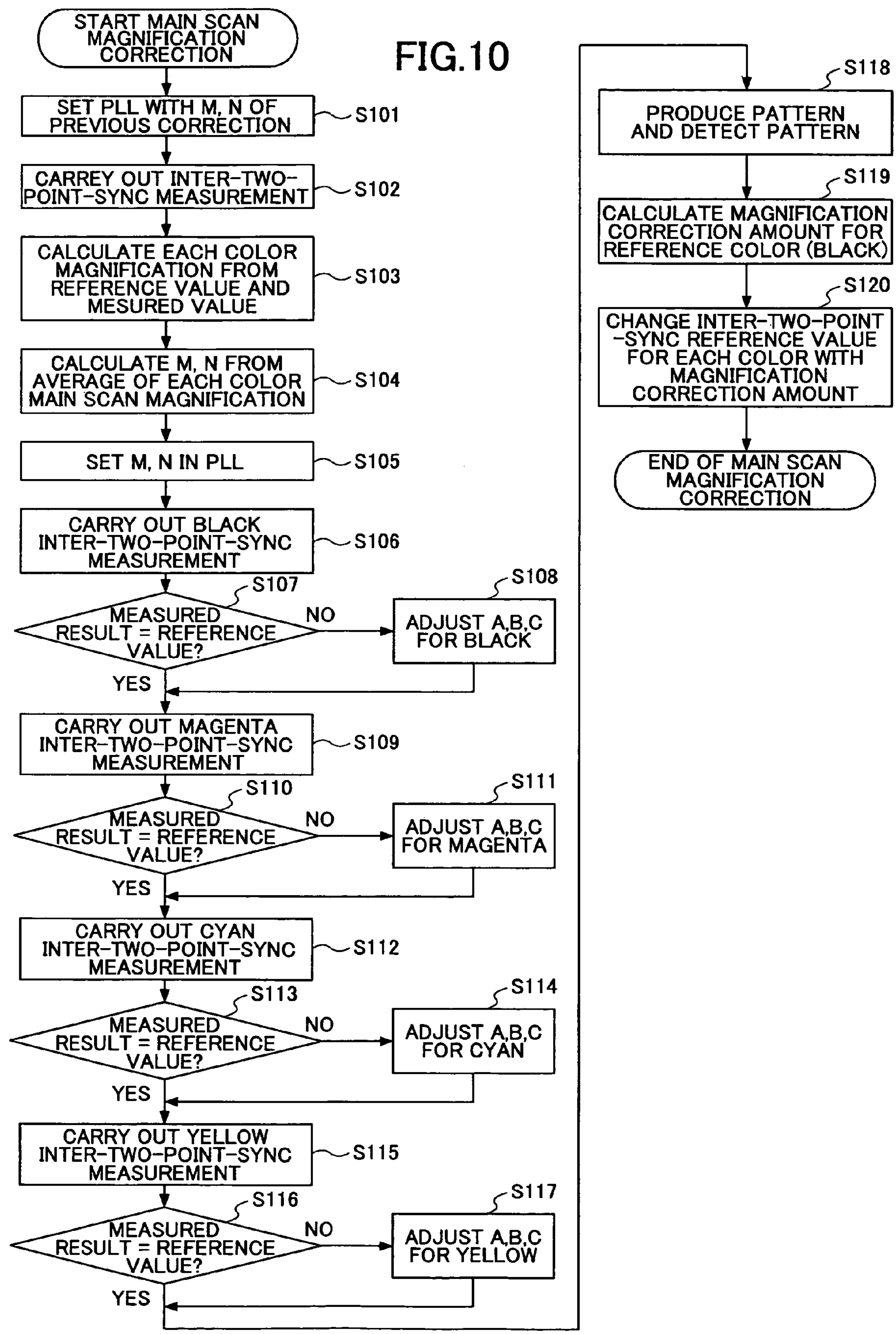
FIG.10
START MAIN SCAN MAGNIFICATION CORRECTION
SET PLL WITH M, N OF PREVIOUS CORRECTION
S101
CARREY OUT INTER-TWO-POINT-SYNC MEASUREMENT
S102
CALCULATE EACH COLOR MAGNIFICATION FROM REFERENCE VALUE AND MESURED VALUE
S103
CALCULATE M, N FROM AVERAGE OF EACH COLOR MAIN SCAN MAGNIFICATION
S104
SET M, N IN PLL
S105
CARRY OUT BLACK INTER-TWO-POINT-SYNC MEASUREMENT
S106
S107
MEASURED RESULT = REFERENCE VALUE?
NO
YES
S108
ADJUST A,B,C FOR BLACK
CARRY OUT MAGENTA INTER-TWO-POINT-SYNC MEASUREMENT
S109
S110
MEASURED RESULT = REFERENCE VALUE?
NO
YES
S111
ADJUST A,B,C FOR MAGENTA
CARRY OUT CYAN INTER-TWO-POINT-SYNC MEASUREMENT
S112
S113
MEASURED RESULT = REFERENCE VALUE?
NO
YES
S114
ADJUST A,B,C FOR CYAN
CARRY OUT YELLOW INTER-TWO-POINT-SYNC MEASUREMENT
S115
S116
MEASURED RESULT = REFERENCE VALUE?
NO
YES
S117
ADJUST A,B,C FOR YELLOW
S118
PRODUCE PATTERN AND DETECT PATTERN
S119
CALCULATE MAGNIFICATION CORRECTION AMOUNT FOR REFERENCE COLOR (BLACK)
S120
CHANGE INTER-TWO-POINT -SYNC REFERENCE VALUE FOR EACH COLOR WITH MAGNIFICATION CORRECTION AMOUNT
END OF MAIN SCAN MAGNIFICATION CORRECTION

FIG.12

| (1) | | | (2) | | | (3) | | | |
|---|---|---|---|---|---|---|---|---|---|
| ASSIGNMENT PULSE NUMBER FOR 1 LINE (A) | ASSIGN-MENT PERIOD (B) | SET MAGNIFICATION | ASSIGNMENT PULSE NUMBER FROM FRONT END SYNC DETECTION TO RIGHT SENSOR | MAGNIFICATION AT RIGHT SENSOR | ERROR | ASSIGNMENT PULSE NUMBER UP TO RIGHT SENSOR UPON PRODUCING PATTERN(A') | ASSIGN-MENT PERIOD (B') | MAGNIFICATION AT RIGHT SENSOR | ERROR |
| 10 | 755 | 100.017% | 9 | 100.016% | 0.000% | 9 | 761 | 100.016% | 0.000% |
| 20 | 377 | 100.033% | 18 | 100.033% | 0.000% | 18 | 380 | 100.033% | 0.000% |
| 30 | 251 | 100.050% | 27 | 100.049% | 0.000% | 27 | 253 | 100.049% | 0.000% |
| 40 | 188 | 100.066% | 36 | 100.066% | 0.000% | 36 | 190 | 100.066% | 0.000% |
| 50 | 151 | 100.083% | 45 | 100.082% | 0.001% | 45 | 152 | 100.082% | 0.001% |
| ⋮ | | | | | | | | | |
| 800 | 9 | 101.323% | 761 | 101.389% | −0.066% | 725 | 9 | 101.323% | 0.000% |
| 810 | 9 | 101.339% | 761 | 101.389% | −0.049% | 734 | 9 | 101.339% | 0.000% |
| 820 | 9 | 101.356% | 761 | 101.389% | −0.033% | 743 | 9 | 101.356% | 0.000% |
| 830 | 9 | 101.373% | 761 | 101.389% | −0.016% | 752 | 9 | 101.372% | 0.000% |
| 840 | 8 | 101.389% | 856 | 101.562% | −0.173% | 761 | 9 | 101.389% | 0.000% |
| 850 | 8 | 101.406% | 856 | 101.562% | −0.156% | 770 | 8 | 101.405% | 0.000% |
| 860 | 8 | 101.422% | 856 | 101.562% | −0.140% | 779 | 8 | 101.422% | 0.001% |
| 870 | 8 | 101.439% | 856 | 101.562% | −0.123% | 788 | 8 | 101.438% | 0.001% |
| 880 | 8 | 101.455% | 856 | 101.562% | −0.107% | 797 | 8 | 101.454% | 0.001% |
| 890 | 8 | 101.472% | 856 | 101.562% | −0.090% | 807 | 8 | 101.473% | −0.001% |
| 900 | 8 | 101.488% | 856 | 101.562% | −0.074% | 816 | 8 | 101.489% | −0.001% |
| 910 | 8 | 101.505% | 856 | 101.562% | −0.057% | 825 | 8 | 101.505% | −0.001% |
| 920 | 8 | 101.521% | 856 | 101.562% | −0.041% | 834 | 8 | 101.522% | −0.001% |
| 930 | 8 | 101.538% | 856 | 101.562% | −0.024% | 843 | 8 | 101.538% | 0.000% |
| 940 | 8 | 101.554% | 856 | 101.562% | −0.008% | 852 | 8 | 101.555% | 0.000% |
| 950 | 7 | 101.571% | 978 | 101.785% | −0.214% | 861 | 7 | 101.571% | 0.000% |
| 960 | 7 | 101.588% | 978 | 101.785% | −0.197% | 870 | 7 | 101.588% | 0.000% |
| 970 | 7 | 101.604% | 978 | 101.785% | −0.181% | 879 | 7 | 101.604% | 0.000% |
| 980 | 7 | 101.621% | 978 | 101.785% | −0.164% | 888 | 7 | 101.620% | 0.000% |
| 990 | 7 | 101.637% | 978 | 101.785% | −0.148% | 897 | 7 | 101.637% | 0.000% |
| 1000 | 7 | 101.654% | 978 | 101.785% | −0.131% | 906 | 7 | 101.653% | 0.000% |

FIG.15

| (1) | | | (3) | | | (4) | | | |
|---|---|---|---|---|---|---|---|---|---|
| ASSIGNMENT PULSE NUMBER FOR 1 LINE (A) | ASSIGN -MENT PERIOD (B) | SET MAGNIFICATION | ASSIGNMENT PULSE NUMBER FROM FRONT END SYNC DETECTION TO LEFT SENSOR | MAGNIFICATION AT LEFT SENSOR | ERROR | ASSIGNMENT PULSE NUMBER UP TO LEFT SENSOR UPON PRODUCING PATTERN(A0) | ASSIGN -MENT PERIOD (B0) | MAGNIFICATION AT LEFT SENSOR | ERROR |
| 10 | 755 | 100.017% | 0 | 100.000% | 0.017% | 1 | 709 | 100.018% | −0.001% |
| 20 | 377 | 100.033% | 1 | 100.018% | 0.015% | 2 | 354 | 100.035% | −0.002% |
| 30 | 251 | 100.050% | 2 | 100.035% | 0.014% | 3 | 236 | 100.053% | −0.003% |
| 40 | 188 | 100.066% | 3 | 100.053% | 0.013% | 4 | 177 | 100.071% | −0.004% |
| 50 | 151 | 100.083% | 4 | 100.071% | 0.012% | 5 | 141 | 100.088% | −0.005% |
| ⋮ | | | | | | | | | |
| 800 | 9 | 101.323% | 78 | 101.375% | −0.052% | 75 | 9 | 101.322% | 0.001% |
| 810 | 9 | 101.339% | 78 | 101.375% | −0.036% | 76 | 9 | 101.340% | 0.000% |
| 820 | 9 | 101.356% | 78 | 101.375% | −0.019% | 77 | 9 | 101.358% | −0.002% |
| 830 | 9 | 101.373% | 78 | 101.375% | −0.003% | 78 | 9 | 101.375% | −0.003% |
| 840 | 8 | 101.389% | 78 | 101.375% | 0.014% | 79 | 8 | 101.393% | −0.004% |
| 850 | 8 | 101.406% | 88 | 101.551% | −0.146% | 80 | 8 | 101.410% | −0.005% |
| 860 | 8 | 101.422% | 88 | 101.551% | −0.129% | 81 | 8 | 101.428% | −0.006% |
| 870 | 8 | 101.439% | 88 | 101.551% | −0.113% | 82 | 8 | 101.446% | −0.007% |
| 880 | 8 | 101.455% | 88 | 101.551% | −0.096% | 83 | 8 | 101.463% | −0.008% |
| 890 | 8 | 101.472% | 88 | 101.551% | −0.080% | 83 | 8 | 101.463% | 0.008% |
| 900 | 8 | 101.488% | 88 | 101.551% | −0.063% | 84 | 8 | 101.481% | 0.007% |
| 910 | 8 | 101.505% | 88 | 101.551% | −0.047% | 85 | 8 | 101.499% | 0.006% |
| 920 | 8 | 101.521% | 88 | 101.551% | −0.030% | 86 | 8 | 101.516% | 0.005% |
| 930 | 8 | 101.538% | 88 | 101.551% | −0.014% | 87 | 8 | 101.534% | 0.004% |
| 940 | 8 | 101.554% | 88 | 101.551% | 0.003% | 88 | 8 | 101.551% | 0.003% |
| 950 | 7 | 101.571% | 101 | 101.781% | −0.210% | 89 | 7 | 101.569% | 0.002% |
| 960 | 7 | 101.588% | 101 | 101.781% | −0.193% | 90 | 7 | 101.587% | 0.001% |
| 970 | 7 | 101.604% | 101 | 101.781% | −0.177% | 91 | 7 | 101.604% | 0.000% |
| 980 | 7 | 101.621% | 101 | 101.781% | −0.160% | 92 | 7 | 101.622% | −0.001% |
| 990 | 7 | 101.637% | 101 | 101.781% | −0.144% | 93 | 7 | 101.640% | −0.003% |
| 1000 | 7 | 101.654% | 101 | 101.781% | −0.127% | 94 | 7 | 101.657% | −0.004% |

IMAGE FORMING APPARATUS, IMAGE FORMING METHOD, PROGRAM AND COMPUTER READABLE INFORMATION RECORDING MEDIUM

BACKGROUND OF THE INVENTION

1. Field of the Invention

The present invention relates to an image forming apparatus, an image forming method, a program and a computer readable information recording medium, and in particular, to an-image forming apparatus, in which positional shift occurring upon image forming operation can be effectively inhibited, an image forming method executed in the apparatus, a program including instructions for executing the method by control of a computer and a computer readable information recording medium storing the program.

2. Description of the Related Art

Many manners are known for an image forming process applied in an image forming apparatus for forming a color image with electrophotographic technology. As one thereof, a tandem type one is known.

In this type, photosensitive bodies for respective color images to produce are provided, together with image forming process elements corresponding to the photosensitive bodies. In this configuration, these photosensitive bodies and image forming process elements are disposed along an intermediate transfer member or a paper conveyance belt, images produced therewith for the respective colors are overlaid together on the intermediate transfer member, or the color images produced on the postpositive bodies are transferred to paper each time the paper conveyed by the paper conveyance belt passes through a respective one of transfer processes of the respective photosensitive bodies, and thus, a full color image is produced as a result of all the transfer stations being passed therethrough.

FIG. 3 shows one example of a configuration of an image forming unit PTR of a color image forming apparatus in the latter one of the tandem type image forming apparatus, disclosed by Japanese Laid-open Patent Application No. 2004-237623.

In the figure, photosensitive drums 6*a* through 6*d* for forming images of different colors (yellow, magenta, cyan and black, which may be simply referred to as alphabets, i.e., Y/y, M/m, C/c and K/bk, respectively, hereinafter) are disposed in one row along a conveyance belt 10 conveying transfer paper.

According to image signals for recording, an exposure unit 5 emits laser beams modulated by the respective Y, M, C and K recording image signals, which scan the photosensitive drums 6*a* through 6*d*, respectively, which are previously uniformly electrically charged by a charger. Thus, electrostatic latent images are produced on the photosensitive drums 6*a* through 6*d*, respectively. The respective electrostatic latent images are then developed with Y, M, C and K toners in respective developers 7*a* through 7*d*, and thus, the toner images in the respective colors are obtained.

On the other hand, transfer paper conveyed to an intermediate transfer belt 10 of a transfer belt unit, from a paper feeding cassette 8. Then, on the transfer paper 8 thus placed on the intermediate transfer belt 10, the respective color toner images are transferred in sequenced by transfer units 11*a* through 11*d*, respectively, from the respective photosensitive drums 6*a* through 6*d*, while the transfer paper moves to pass by the respective photosensitive drums 6*a* through 6*d* in sequence as a result of the transfer paper being carried by the intermediate transfer belt 10.

Thus, on the transfer paper, the respective color toner images are overlaid together, and thus, a full color image is produced on the transfer paper.

After that, a fixing unit 12 is applied to fix the full color image, thus produced on the transfer paper, to the transfer paper. After that, the transfer paper is ejected from this machine PTR.

The intermediate transfer belt 10 is a translucent endless belt supported by a driving roller 9, a tension roller 13*a* and a following roller 13*b*. As the tension roller 13*a* is pressed to the belt 10 by means of a spring not shown, tension of the belt 10 is kept constant.

FIG. 4 shows a plan view of an optical unit of the exposure unit 5, shown in FIG. 3, viewed from the top.

In FIG. 4, light beams from a laser diode unit (simply refereed to as an LD unit hereinafter) 31*bk* and a LD unit 31*y*, including laser diodes and laser drivers which modulate the laser light of the laser diodes, pass through cylinder lenses 32*bk*, 32*y*, and are applied to a lower part of a polygon mirror 34 by means of reflective mirrors 33*bk* and 33*y*. Along with rotation of the polygon mirror 34, the polygon mirror 34 deflects the thus-applied light beams, which then pass through fθ lenses 35*bkc* and 35*ym*, and then are bent by first mirrors 36*bk* and 36*y*.

Similarly, light beams from LD units 31*c* and 31*m* pass through cylinder lenses 32*c*, 32*m*, and are applied to an upper part of the polygon mirror 34. Along with rotation of the polygon mirror 34, the polygon mirror 34 deflects the thus-applied light beams, which then pass through the fθ lenses 35*bkc* and 35*ym*, and then are bent by first mirrors 36*c* and 36*m*.

On an upstream side of a writing start position in a main scan direction, cylinder mirrors 37*bkc* and 37*ym*, as well as, sensors 38*bkc* and 38*ym* are provided. The light beams passing through the fθ lenses 35*bkc* and 35*ym* are then reflected and condensed by the cylinder mirrors 37*bkc* and 37*ym*, and thus are applied to the sensors 38*bkc* and 38*ym*. These sensors 38*bkc* and 38*ym* are synchronization detecting sensors for carrying out synchronization in the main scan direction.

On a downstream side of an imaging range, the same as the above-mentioned upstream side, cylinder mirrors 39*bkc* and 39*ym*, as well as, sensors 40*bkc* and 40*ym* are provided. The light beams passing through the fθ lenses 35*bkc* and 35*ym* are then reflected and condensed by the cylinder mirrors 39*bkc* and 39*ym*, and thus are applied to the sensors 40*bkc* and 40*ym* (also synchronization detecting sensors).

For the purpose of detecting the light beams from the LD units 31*bkc* and 31*c*, the sensors 38*bkc* on the writing start side and the sensor 40*bkc* on the writing end side, are applied commonly. Similarly, for the purpose of detecting the light beams from the LD units 31*y* and 31*m*, the sensors 38*ym* on the writing start side and the sensor 40*ym* on the writing end side, are applied commonly.

Since these two different color image forming light beams are applied to the same sensor, incident angles to the polygon mirror 34 are made different between the respective color light beams, and thus, timing at which the respective light beams are actually applied to each sensor can be changed. Thereby, the corresponding respective detected signals are output from each sensor in a form of a time-series pulse sequence. As shown in FIG. 4, scanning directions for K (bk) and C (c) are opposite to that for Y (y) and M (m).

SUMMARY OF THE INVENTION

So-called color drift correction processing in the main scan direction is carried out for eliminating color drift otherwise occurring upon combining the respective color toner images in such a color tandem type machine.

Specifically, a main scan magnification is obtained from a measurement of light beam scanning timing with the use of the respective optical sensors 38*ym*, 38*bkc*, 40*ym* and 40*bkc*. The main scan magnification means a ratio of a main scanning range actually obtained from being scanned by the light beam, with respect to a main scan direction width of an input image.

Assuming that a main scan period is fixed, if the main scan magnification increases for example as a result of magnification of an optical system (i.e., various sorts of lenses, mirrors and so fourth) changing due to environmental change, a time interval of applying of the light beam to the optical sensors, provided at both ends of the scanning light beam scanning range, reduces accordingly. By measuring this time interval, the main scan magnification can be measured. Such a manner of measuring the main scan magnification is referred to as 'inter-two-point-synchronization detection measurement', and the detections at both ends are referred to as two-point synchronization detections or front end through rear end synchronization detections, hereinafter.

Then, in order to correct a difference of the measured value from a reference value, a clock pulse waveform of a pixel clock signal applied for modulating the light beam with given image data, emitted from the laser diode, is adjusted. Then, with the use of the thus-adjusted pixel clock signal, as shown in FIG. 5, predetermined correction patterns (or toner mark patterns) 16, 17 are produced on the intimidate transfer belt 10, and these correction patterns 16, 17 are detected by left and right optical sensors 20*f*, 20*r* (see FIG. 5).

Then, a correction parameter is set to be applied to further correct color drift of the respective colors in the main scan direction, calculated from the detection with the use of these optical sensors 20*f*, 20*r*. In ordinary printing operation, this correction parameter is applied, and color drift correction is carried out each time.

The above-mentioned adjustment of the clock pulse waveform of the pixel clock signal is carried out for all the clock pulses corresponding to the main scanning range, in such a manner that a predetermined number of clock pulses included therein are increased or reduced in their pulse widths respectively.

An actual amount of increasing or reducing the main scan magnification can be controlled in proportion to an amount of increasing the number of clock pulses for which the pulse widths are thus increased or reduced by a fixed amount each. The clock pulses for which the pulse widths are thus actually changed by the fixed amount each are assigned along the main scan direction from a scanning start position in sequence for example.

In such a manner, the predetermined number of clock pulses are changed respectively in their pulse widths by the fixed manner each so that a predetermined correction amount may be obtained for the entirety of the main scanning range. In this case, even when the predetermined correction amount for the main scan magnification is obtained for the entirety of the main scanning range, the corresponding predetermined correction amount may not be obtained for a range corresponding to a length between the above-mentioned correction patterns 16, 17, depending on a manner of assigning the clock pluses for which the clock widths are actually changed.

That is, since the length between the correction patterns 16, 17 produced on the intermediate transfer belt 10 is shorter than a length between the optical sensors provided at both ends of the scanning range, applied upon the above-mentioned inter-two-point-synchronization detection, the predetermined main scan magnification may not be reflected on the correction pattern interval although the same main scan magnification is reflected on the entire optical sensor interval of the inter-two-point-synchronization detection.

That is, such a phenomenon occurs for example in a case described now. Assuming that assignment of the clock pulses, for which the pulse widths are changed in the fixed manner, in the preceding correction operation is such that, the assignment is made already throughout a range corresponding to the above-mentioned correction pattern interval, and as a result, assignment of clock pulses located beyond the range corresponding to the correction pattern interval should be made for obtaining a currently required correction amount, for example.

In such a case, although the current predetermined correction amount for the main scan magnification is reflected on the entire main scanning range as a result of the pixel clock signal waveform being adjusted based on the inter-two-point-synchronization detection result, no corresponding correction is reflected on the range corresponding to the correction pattern interval.

As a result, such a measurement result is obtained from the thus-produced correction patterns as if no correction has been made. Accordingly, a control system receiving a feedback of such a measurement result should make a control of further adjusting the pixel clock signal waveform for the purpose pf obtaining the above-mentioned predetermined correction amount. As a result, over-control may result. Thereby, the main scan magnification may not be carried out properly.

The present invention has been devised in consideration of such a problem, and an object of the present invention is to provide a configuration by which main scan magnification can be carried out properly, and positional error correction upon image forming can be effectively made.

According to the present invention, in an image forming apparatus for obtaining an image by scanning with modulated light modulated in timing of a predetermined timing signal based on input image information, adjustment is made, upon predetermined mark image measurement, on the timing signal for obtaining a required correction amount for a scan magnification of the modulated light in a measurement range of the predetermined mark image measurement; and adjustment is made, upon regular image forming operation, on the timing signal for obtaining the required correction amount for the scan magnification of the modulated light in the entire scanning range of the modulated light for the regular image forming operation.

In this configuration, the timing signal is adjusted in such a manner that the required correction amount for the scan magnification of the modulated light may be reflected on the measurement range of the predetermined mark image measurement. As a result, proper evaluation can be made for an achievement of the required correction amount for the scan magnification of the modulated light. As a result, the above-mentioned problem that over-control results from incorrect evaluation for the achievement of the required correction amount for the scan magnification of the modulated light can be solved.

Further, for the regular image forming operation, the timing signal is adjusted for obtaining the required correction amount for the scan magnification of the modulated light in the entire scanning range of the modulated light for the regular image forming operation. Thereby, a problem otherwise newly occurring when the regular image forming operation is carried out without appropriate correction from the state in which the required correction amount for the scan magnification of the modulated light may be obtained particularly in the measurement range for the predetermined mark image measurement, can be avoided.

That is, in the state, as it is, in which the required correction amount for the scan magnification of the modulated light may be obtained particularly in the measurement range for the predetermined mark image measurement, such a situation may occur in which, in the entire scanning range of the modulated light for the regular image forming operation generally wider than the predetermined mark image measurement range, the above-mentioned correction amount for the scan magnification of the modulated light is not obtained. In order to avoid it, the above-mentioned timing signal should be adjusted or corrected in such a manner that, upon regular image forming operation, the required correction amount for the scan magnification of the modulated light may be obtained particularly in the entire scanning range of the modulated light for regular image forming operation.

Thus, according to the present invention, first adjustment is made, upon predetermined mark image measurement, on the timing signal for obtaining a required correction amount for a scan magnification of the modulated light particularly in a measurement range of the predetermined mark image measurement; and, second adjustment is made, upon regular image forming operation, on the timing signal for obtaining the required correction amount for the scan magnification of the modulated light particularly in the entire scanning range of the modulated light for regular image forming operation.

As a result, a configuration can be provided such that, without regard to the measurement range of the predetermined mark image measurement, which is generally narrower than the entire main scanning range or the entire range applied for regular image forming operation, the correction result can be always properly evaluated. As a result, postional error upon image forming operation can be effectively and positively corrected.

BRIEF DESCRIPTION OF THE DRAWINGS

Other objects and further features of the present invention will become more apparent from the following detailed description when read in conjunction with the accompanying drawings:

FIG. 10 shows a flow chart of a processing procedure of main scan magnification correction;

FIG. 12 shows an assignment pulse number (A) and an assignment period (B) for a case of changing main scan magnification in a plus direction;

FIG. 15 shows the assignment pulse number (A) and the assignment period (B) for a case of changing main scan magnification in a plus direction according to the second embodiment of the present invention.

DETAILED DESCRIPTION OF THE PREFERRED EMBODIMENTS

A first embodiment of the present invention will now be described.

Figure 1:
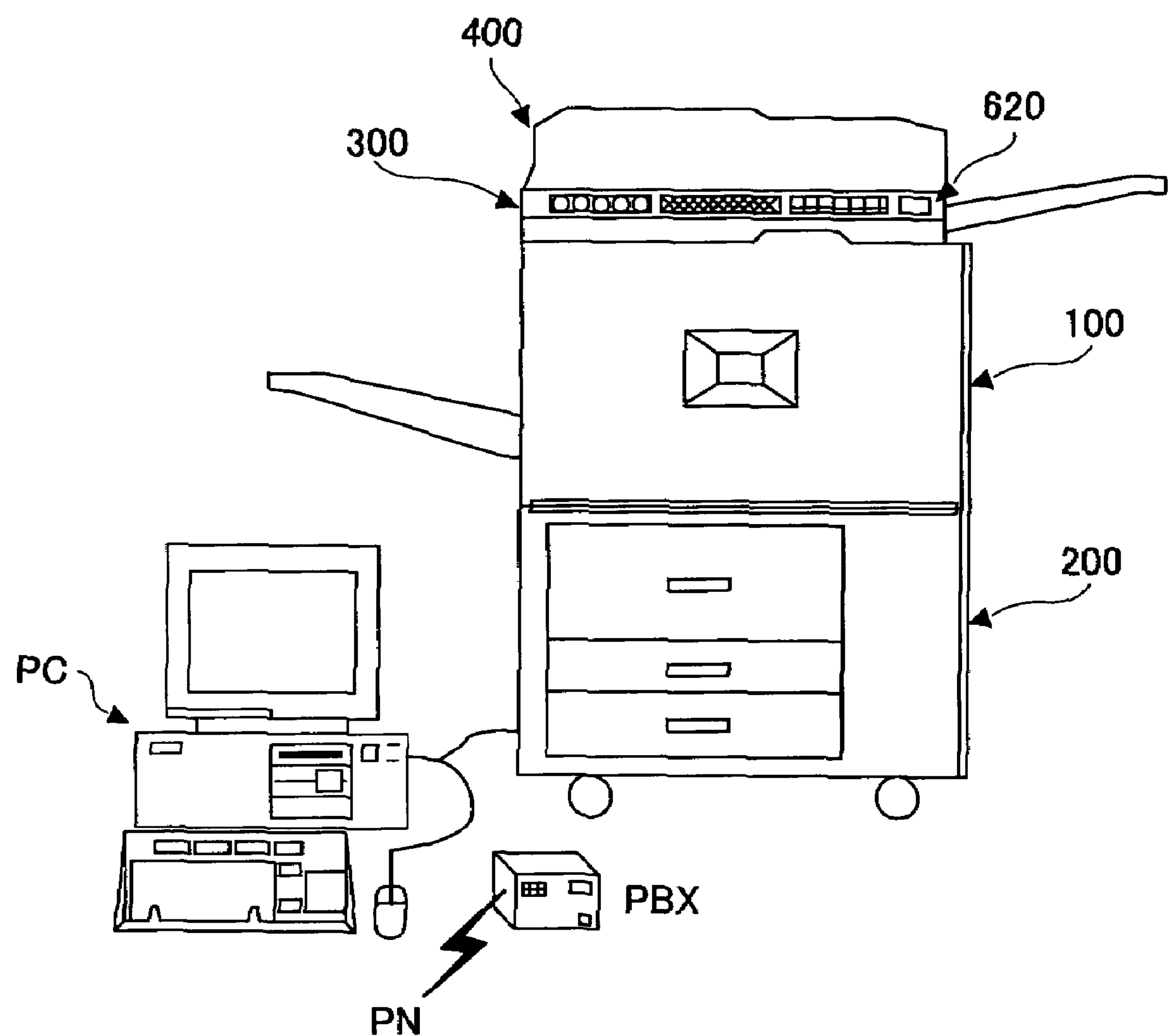
FIG. 1 shows a front view of a full-color copier in a first embodiment of the present invention.

FIG. 1 shows an appearance of a multifunction full-color digital copier in a first embodiment of the present invention. This full-color copier includes respective units, i.e., an automatic draft feeder (ADF) 400, an operation board 610, a color scanner 300, a color printer 100 and a paper feeding table 200. To a system controller 630 (see FIG. 2) included in this machine, a LAN (local area network) to which a personal computer PC is connected, is connected.

The system controller 630 can be connected to a communication network such as the Internet, and, through the communication network, connection can be made with a management server of a management center not shown, with which data can be exchanged.

A facsimile controller (FCU) also included in this machine (see FIG. 2) can carry out facsimile communication via a switching equipment PBX and a public communication network PN.

Figure 2:
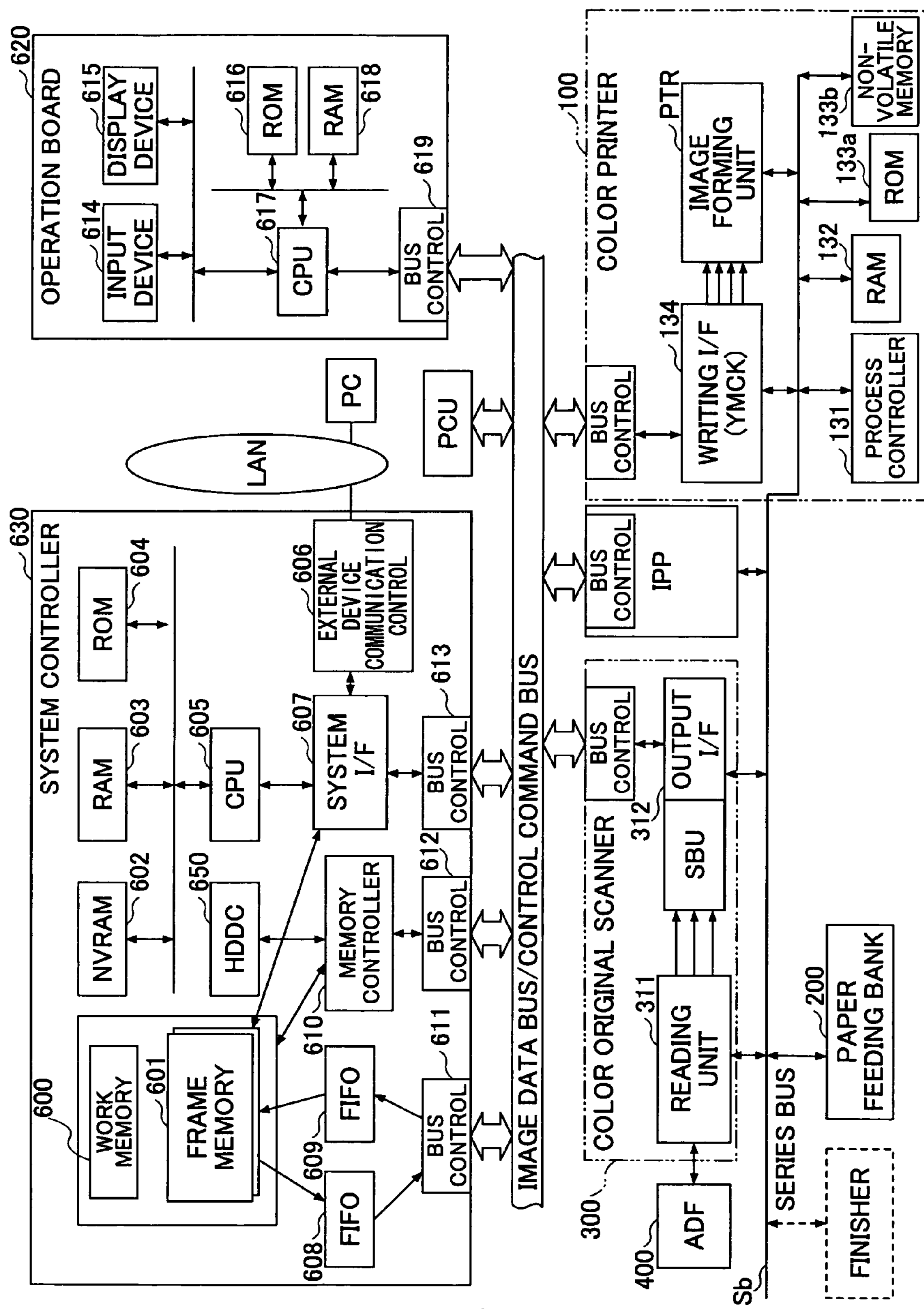
FIG. 2 shows a block diagram of an image data processing system in the full-color copier shown in FIG. 1.

FIG. 2 shows a system configuration of the copier shown in FIG. 1 for image reading, image processing, image storage and image forming. A reading unit 311 included in the color scanner 300 for optically reading an original scans the original with light from an original irradiation light source, and forms an image of the original on a CCD of a sensor board unit SBU. The CCD carries out photoelectric conversion from the original image, i.e., reflected light from the original, into R, B, B image signals, which are then converted into RGB image data in the SBU, undergo shading correction, and are output to an image data processing device IPP (image processing processor) via an image data bus from an output I/F (interface) 312.

The IPP carries out image zone classification (into a characteristic zone and a photograph zone), background removal, scanner gamma correction, filtering, color correction, size change, image modification, printer gamma correction and tone processing. The IPP is a programmable processing part carrying out image processing. Image data thus transferred from the scanner 300 to the IPP is corrected in its signal degradation occurring in an optical system or occurring upon quantization into the digital signal, and then, is written in a frame memory 601.

The system controller 630 has functions of a plurality of applications, i.e., a scanner application, a facsimile application, a printer application, a copy application and so forth, and carries out control of the system entirety. An operation panel control unit 631 interprets input made via the operation board 620, or displays the system setting and the system status. An image data bus/control command bus transfers, in a time-division manner, image data and control commands.

A CPU 605 of the system controller 630 carries out control of the system controller 630. In a ROM 604, control programs are written for controlling the system controller 630. A RAM 603 is used as a work memory of the CPU 605. An NVRAM 602 is a nonvolatile memory, and stores information for the system entirety.

An external equipment communication control part 606 carries out communication control between external equipment which requests image reading, image storage and image printing (for example, a copier in the same type, an image scanner, a personal computer, a printer, a facsimile or such) and the management server of the management center, and, carries out control of a physical I/F for connecting to the communication network.

When the external equipment communication control part 606 receives data from the communication network, only the contents of communication data of the thus-received electrical signal is sent to a system I/F 607. The system I/F 607 sends the received data to the CPU 605 after carrying out logical conversion thereon according to a prescribed protocol. The CPU 605 makes determination and processing on the thus-logically-converted data.

When the CPU 605 transmits data to the communication network, transmission data is transmitted through the system I/F 607 and the external equipment communication control part 606 in a reverse procedure, and then, is transmitted to the communication network as a corresponding electric signal.

The system I/F 607 carries out transfer control for original reading data, facsimile reception data and document data provided to the personal computer (printing instructions), to be processed in the system according to instructions from the CPU 605, as well as carries out conversion of the document data provided to the personal computer into image data and transfers thereof.

A work memory 600 is used as a work memory for image expansion (conversion from document data into image data) for the printer. The frame memory 601 is a work memory temporarily storing read image data or written image data to be immediately printed out in a condition where power supply is provided.

An HDDC 650 includes a hard disk drive and a controller therefor, used as an application database storing the system application programs and device driving information for image forming processing devices of the printer 100, and also, as an image database storing read image data, writing image data, and document data. The image data and the document data may include encoded data or dot images.

A FIFO buffer memory 609 carries out data transfer speed conversion upon writing an input image in the frame memory 601. That is, it temporarily stores data for absorbing a timing difference, a transfer unit data amount difference, a transfer speed difference or such, between data reception from a transfer source and data sending to a transfer destination. For this purpose, it receives data in transfer timing and speed of the transfer source, and then, sends the data in transfer timing and speed of the transfer destination. Similarly, a FIFO buffer memory 608 carries out data transfer speed conversion upon transferring image data of the frame memory 601 as an output image.

A memory controller 610 controls input/output of images between the frame memory 601 or the HDDC 650 and the bus, without control of the CPU 605. Further, in response to a command received via an input device 614 of the operation board 620, the memory controller 610 carries out editing, modification or combination of images stored in the HDDC 650 with the use of the frame memory 601. The memory controller 610 has a function of various sorts of image processing or editing operation through functions of reading of image information from the HDD of the HDDC 650 into the work memory 600 or the frame memory 601; changing an image printing direction of transfer paper, rotation of an image, combining and editing of images, through image data address conversion; tone conversion of image data through addition/subtraction/multiplication/dividing of corresponding set values; image trimming and combining through logical multiplication operation or logical sum operation for image data; and writing image data, thus processed, in the HDD.

A CPU 617 carries out input/output control of the operation board 620. That is, it controls reading of an input and displaying of an output through the operation board 620. In a ROM 616, a control program for the operation board 620 is written. A RAM 618 is a work memory used by the CPU 617. The input device 614 is used for an operator to input system setting by operating input keys and an input panel of the operation board 620. A display device 615 displays the system setting contents/states for the operator. The display device 615 includes display lamps and a display panel (liquid crystal touch panel) having an inputting function.

Figure 3:
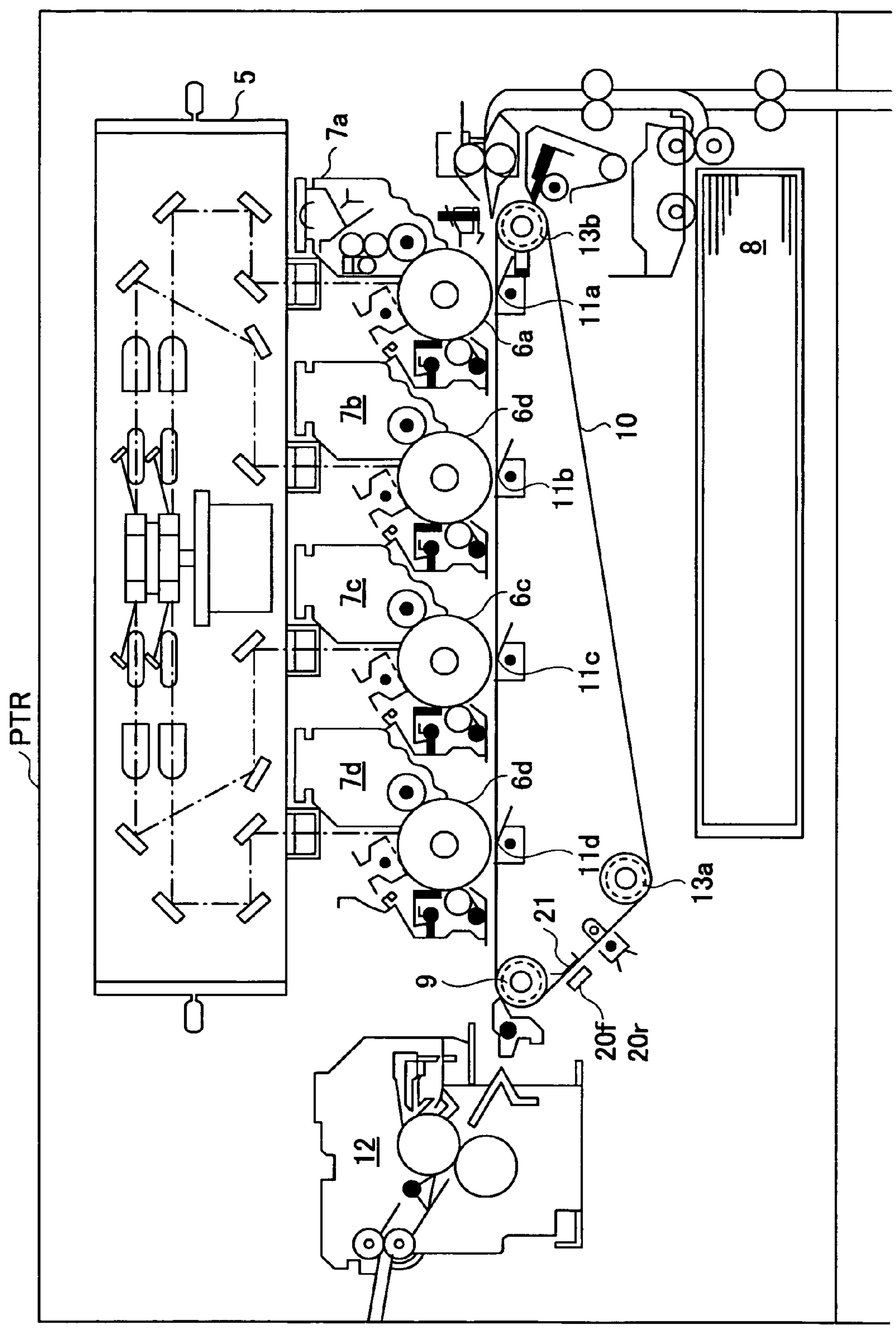
FIG. 3 shows an image forming mechanism of an image forming unit PTR included in a printer 100 shown in FIGS. 1 and 2.
Figure 4:
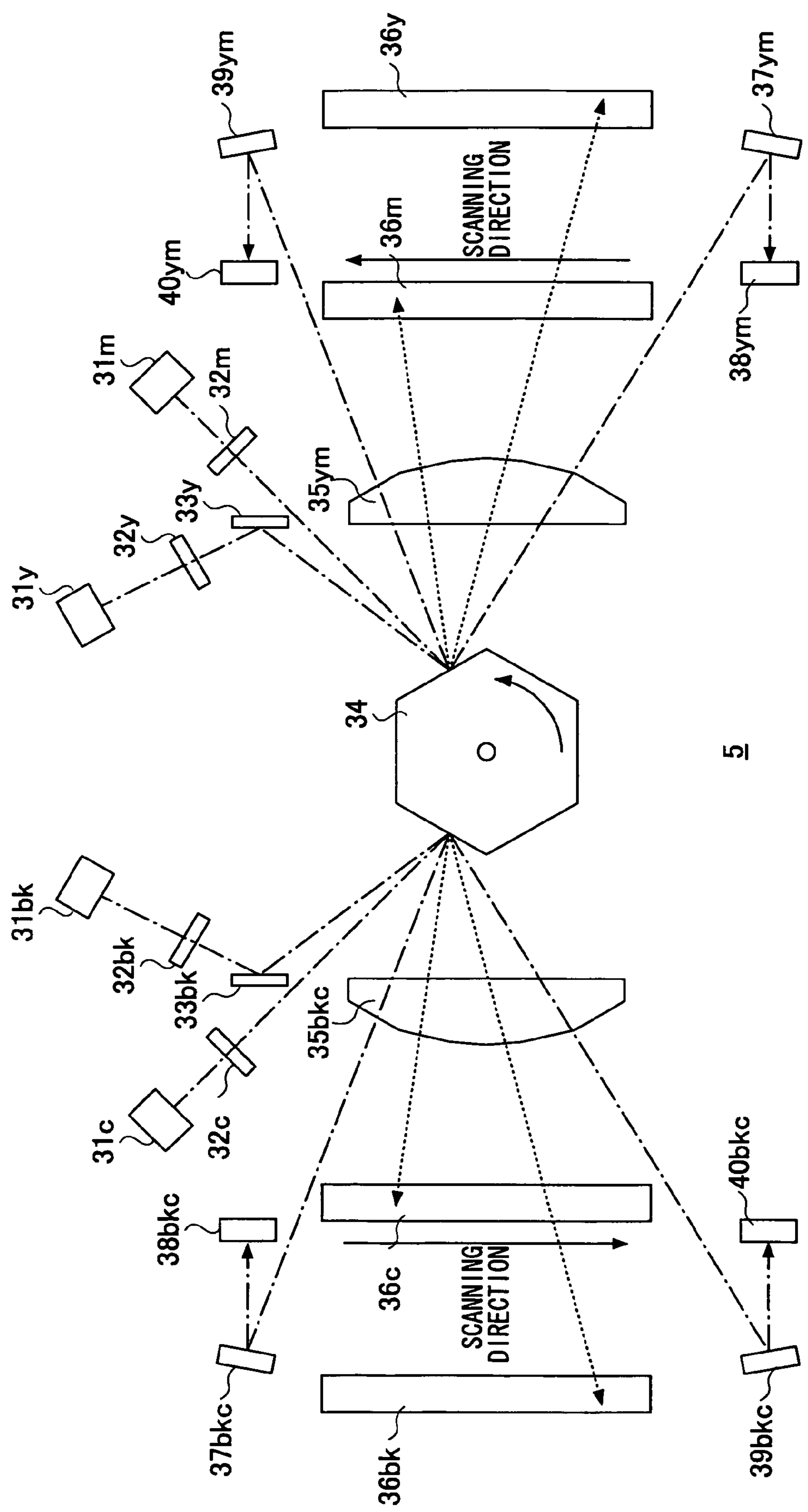
FIG. 4 shows a magnified view of an exposure unit 5 shown in FIG. 3.

The image forming mechanism of the image forming unit PTR is shown in FIG. 3, and has been already described above. Also, the exposure unit 5 of the image forming unit PTR is shown in FIG. 4, and has been already described above.

Further, in this full-color copier, the reflective type detection sensors 20*f* and 20*r* (see FIGS. 3 and 5) are provided on both sides in the main scan direction with a mounting distance L1 [mm] therebetween (see FIG. 5) for determining, from a change in a voltage value output therefrom, positions of the toner mark rows, produced on the intermediate transfer belt 10, for the purpose of scan magnification correction. The mounting distance Li means a distance between these sensors 20*f* and 20*r* as shown in FIG. 5.

Figure 5:
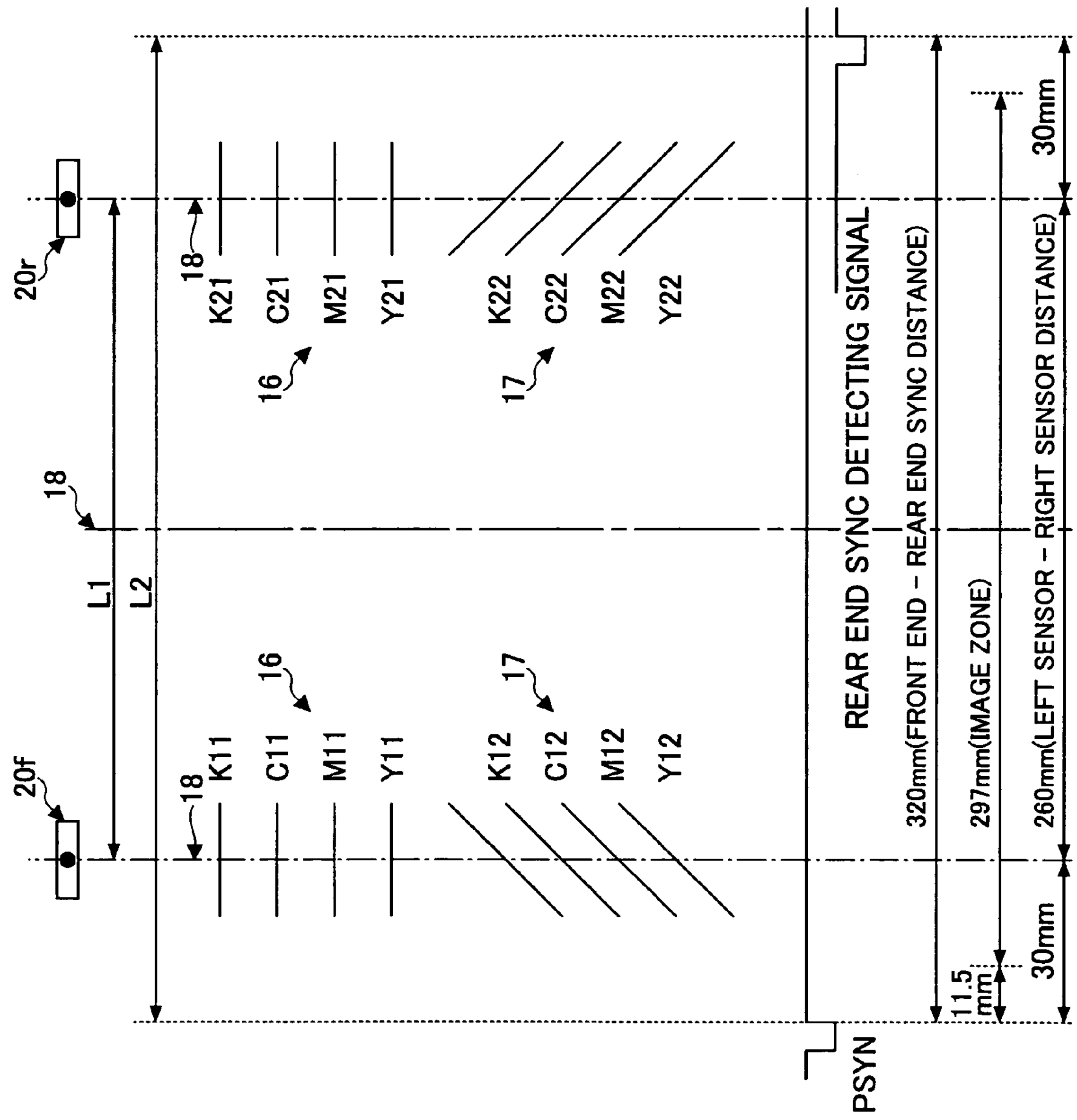
FIG. 5 shows one example of toner marks (correction patterns) produced on an intermediate transfer belt.

FIG. 5 shows one example of the toner marks (or correction patterns) produced on the intimidate transfer belt 10. K, C, M and Y lateral lines 16 (K11, C11, M11, Y11, K21, C21, M21 and Y21) and oblique lines 17 (K12, C12, M12, Y12, K22, C22, M22 and Y22) are produced, respectively, as shown, on the intermediate transfer belt 10 by the image forming unit PTR described above with reference to FIG. 3. Then, by detecting these toner marks 16 and 17 with the use of the detection sensors 20*f*, 20*r*, a central position 18 of the toner marks 16, 17 is obtained, and skews, a sub-scan registration error, a main scan registration error and a main scan magnification error, with respect to those of a reference color (in this case, black K), can be measured. An art of detecting a main scan direction positional error with the use of such toner marks of lateral lines and oblique lines and correcting the same, is well-known (see Japanese Patent No. 2642351, for example). Instructions for executing calculation of such various sorts of error amounts and correction amounts as well as executing correction therewith are made by the main CPU 605 (i.e., the CPU 605 in the system controller 630, see FIG. 2), provided in the full-color copier for example.

Figure 6:
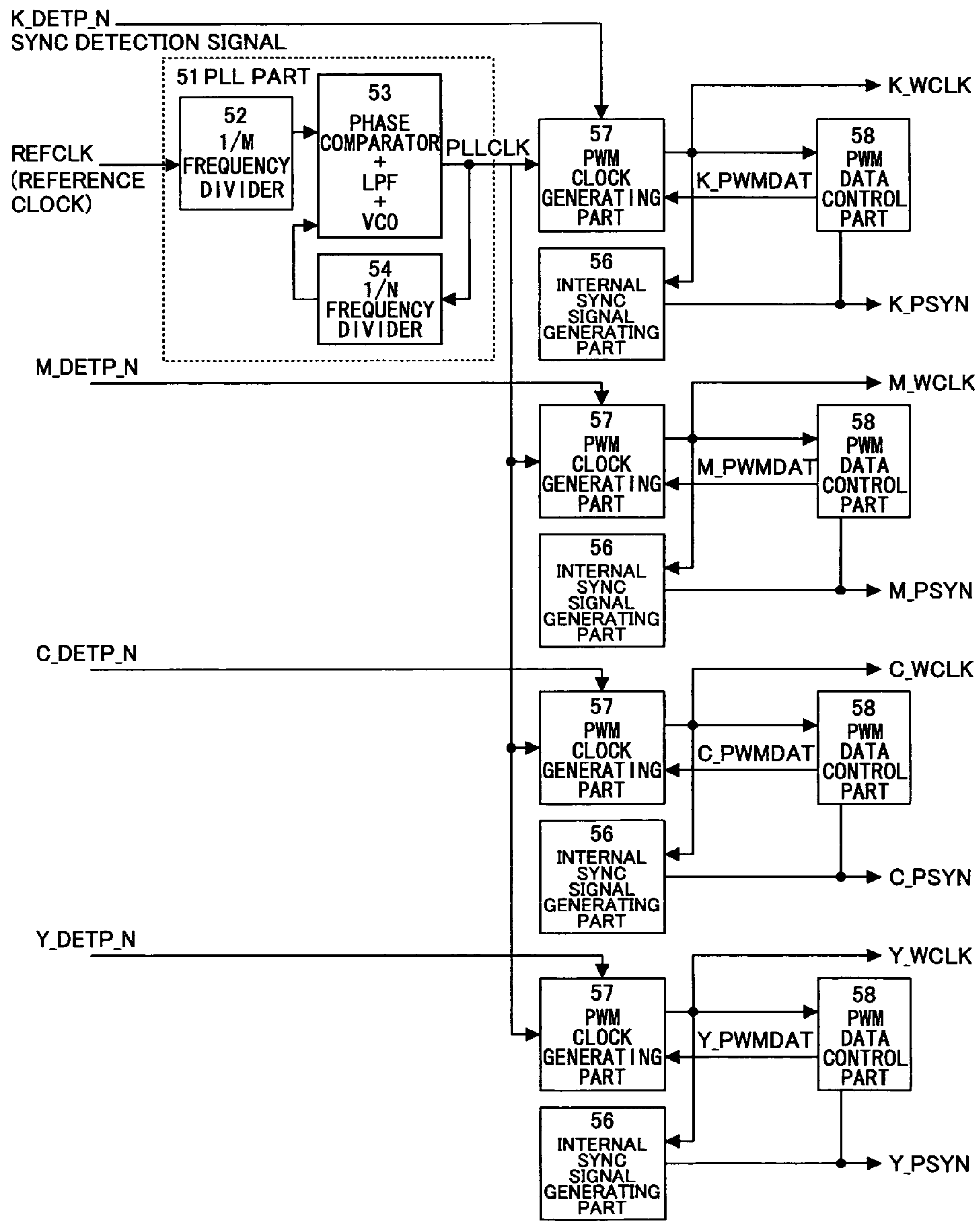
FIG. 6 shows a block diagram of a pixel clock generating part in the image forming unit.

FIG. 6 shows a block diagram of a pixel clock generating part included in the image forming unit PTR. Pixel clock signals are clock signals (which may be simply referred to as 'clocks', hereinafter) used for writing image data. As shown, in a PLL part 51, common for the respective colors K, C, M and Y, a signal which is obtained from a frequency of a reference clock (REFCLK) as a result of it being divided with a dividing coefficient M by a 1/M divider 52, and a signal which is obtained from a frequency of an output signal PLLCLK (high frequency clock) of the PLL part 51 as a result of it being divided with N by a 1/N divider 54, are input to a phase comparator, LPF and VCO 53. Thus, the high frequency clock PLLCLK is generated.

Next, a PWM clock generating part 57 provided for each color divides a frequency of the above-mentioned high frequency clock PLLCLK by K with respect to a synchronization detection signal *_DETP_N (simply referred to as a synchronization detection signal DETP_N), detected by the above-mentioned synchronization detecting sensors, and thus, generates a pixel clock (*_WCLK) for each color. An internal synchronization signal generating part 56 also provided for each color generates an internal synchronization signal (*_PSYN) in synchronization with the pixel clock. The pixel clock *_WCLK may be simply referred to as a pixel clock WCLK. Similarly, the internal synchronization signal *_PSYN may be simply referred to as an internal synchronization signal PSYN. The pixel clock WCLK and the internal synchronization signal PSYN are applied to generate the pixel signal of the respective color according to given image information, from which the laser light to be applied to the corresponding photosensitive drum for producing thereon the electrostatic latent image is modulated.

It is noted that the symbol '*' inserted at the top of the reference symbol denoting each signal represents the symbol K, M, C or Y indicating each color, i.e., black, magenta, cyan or yellow. By replacing '*' by K, M, C or Y, the symbols coincident with those shown in the figures are obtained accordingly.

It is noted that the frequency $f_{WCLK}$ of the above-mentioned pixel clock WCLK is obtained from the following formula (1) with the frequency $f_{REFCLK}$ of the above-mentioned reference clock REFCLK and the above-mentioned dividing coefficients M, N and K:

$$\begin{aligned} f_{WCLK} &= PLLCLK / K \\ &= (f_{REFCLK} / M \times N) / K \end{aligned} \tag{1}$$

When main scan magnification correction is carried out, an interval between the above-mentioned two synchronization detecting sensors (38*ym* and 40*ym* or 30*bkc* and 40*bkc* shown in FIG. 4) is measured through counting the pixel clock pulses. Then, the above-mentioned dividing coefficients M, N are adjusted in such a manner that the thus-obtained count value may be coincident with a previously set reference count value. Thus, the frequency of the pixel clock is controlled.

Figure 7:
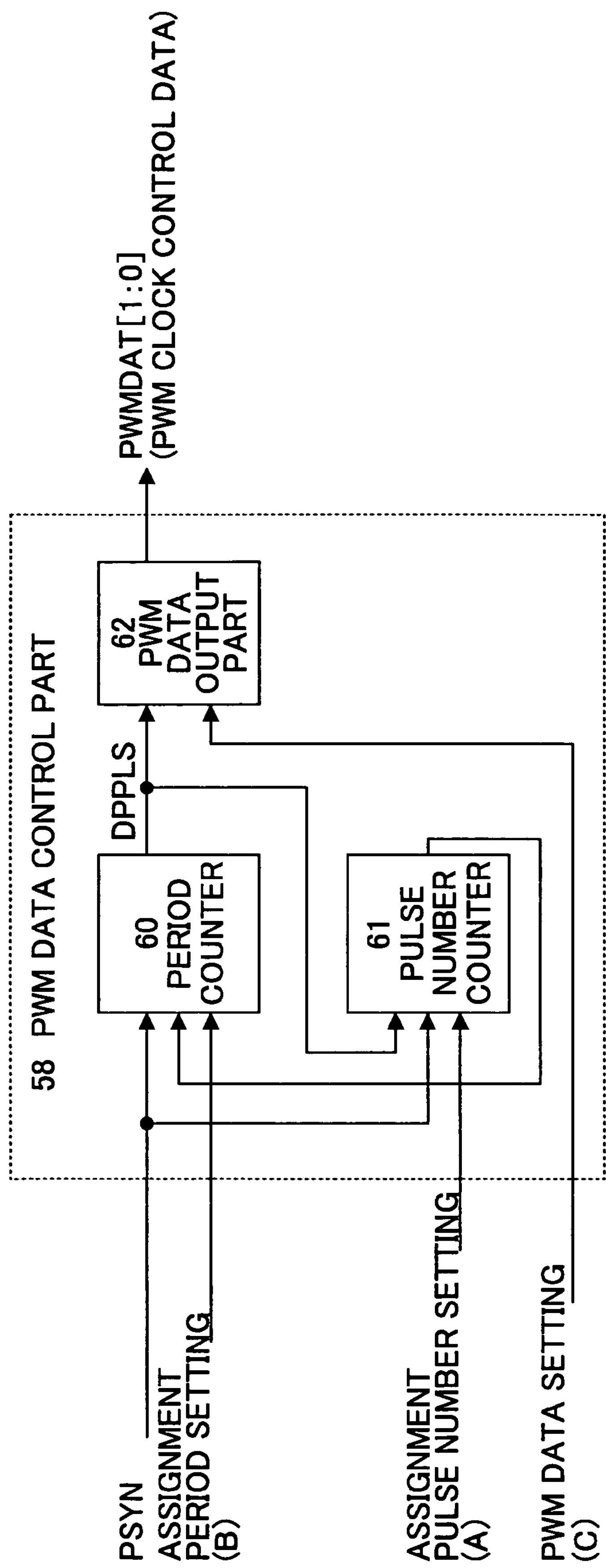
FIG. 7 shows a block diagram of a PWM data control part included in the pixel clock generating part according to the first embodiment of the present invention.

FIG. 7 shows a block diagram of a PWM data control part 58 provided for each color, shown in FIG. 6.

As shown in FIG. 6, the PWM clock generating part 57 divides the frequency of the high frequency clock PLLCLK from the PLL part 51 with the dividing coefficient K, and generates the pixel clock WCLK as mentioned above. In this process, one of a period of a reference frequency, a period shorter than the same, and a period longer than the same, can be selected as a period of the pixel clock to output. That is, whether or not a change of the clock pulse width is carried out, when it is carried out, and whether the change correspond to increase or to reduction of the clock pulse width, can be controlled.

Figure 8:
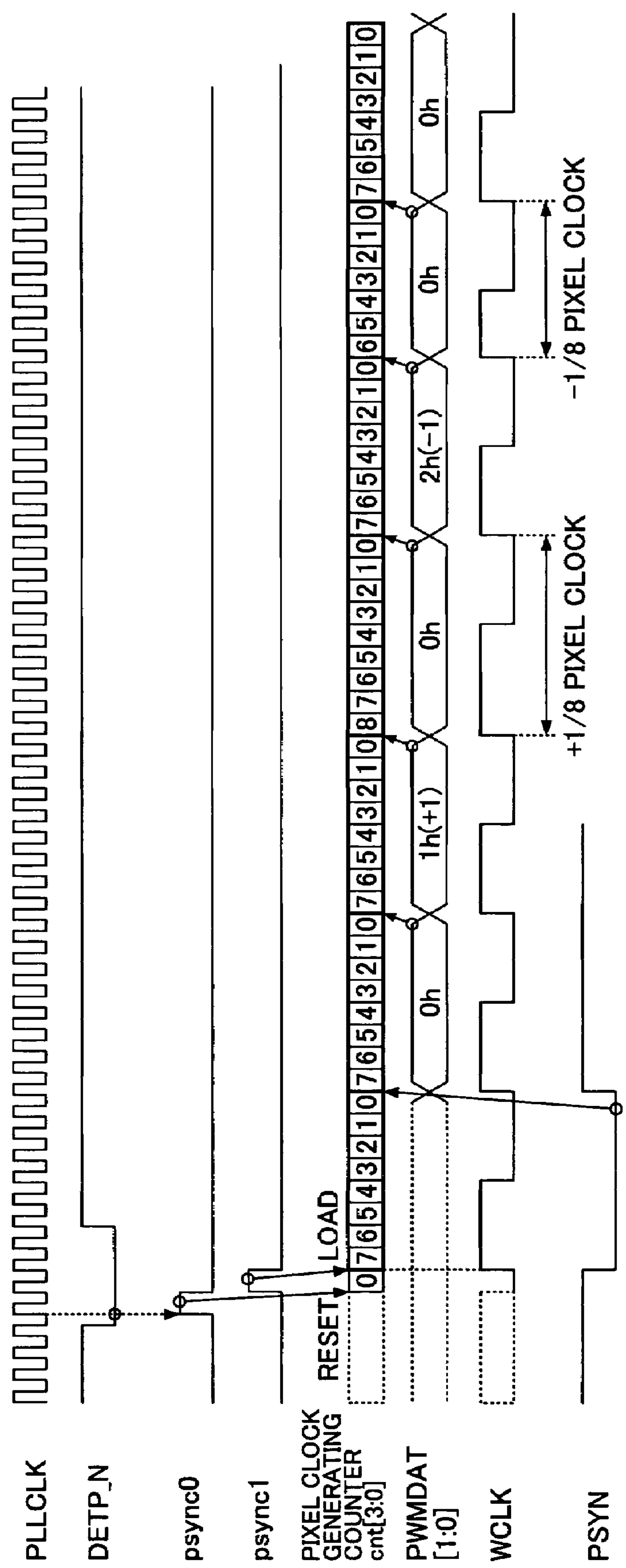
FIG. 8 shows one example of a timing chart for a case of generating a PWM clock signal.

FIG. 8 shows one example of a timing chart for generating a PWM clock, i.e., the pixel clock WCLK. It is assumed that the reference frequency of the pixel clock WCLK is one obtained from the frequency of the above-mentioned high frequency clock PLLCLK being divided by 8, for example. That is, the above-mentioned dividing coefficient K=8.

A counter generating the pixel clock operates based on a rising up of the synchronization detection signal DETP_N in the PWM clock generating part 57. When the data (PWMDAT[1:0]) provided by the above-mentioned PWM data control part 58 indicates '0h', eight pulses are applied for a period (divided by 8); when the data indicates '1h', ninth pulses, for example, are applied for a period (divided by 9), i.e., the pulse width is increased; and when the data indicates '2h', seven pulses, for example, are applied for a period (divided by 7), i.e., the pulse width is reduced, as shown in FIG. 8. Since the semiconductor laser in the above-mentioned exposure unit 5 is driven by this pixel clock WCLK finally, a pixel is elongated by a ⅛pixel when '1h' is input, and a pixel is shortened by a ⅛pixel when '2h' is input, accordingly.

The above-mentioned internal synchronization signal generating part 56 shown in FIG. 6 generates the main scan direction internal synchronization signal PSYN in synchronization with the pixel clock WCLK. The above-mentioned PWM data control part 58 controls the above-mentioned data PWMDAT[1:0 ] provided to the PWM clock generating part 57.

The main CPU 605 sets the number (simply referred to as an assignment pulse number) 'A' of pulses assigned from among the pixel clock pulses included in a main scan line, for each of which the pixel pulse width is changed from one corresponding to the reference frequency, in a predetermined manner; a period 'B' (simply refereed to as an assignment period) of the assignment of the pixel clock pulses; and the above-mentioned data 'C' (PWMDAT[1:0]) in the PWM.data control part 58, for the purpose of controlling the above-mentioned increase/reduction of the pixel clock pulses. By thus controlling the pixel clock pulses, the above-mentioned 'main scan magnification' can be controlled accordingly.

Figure 9:
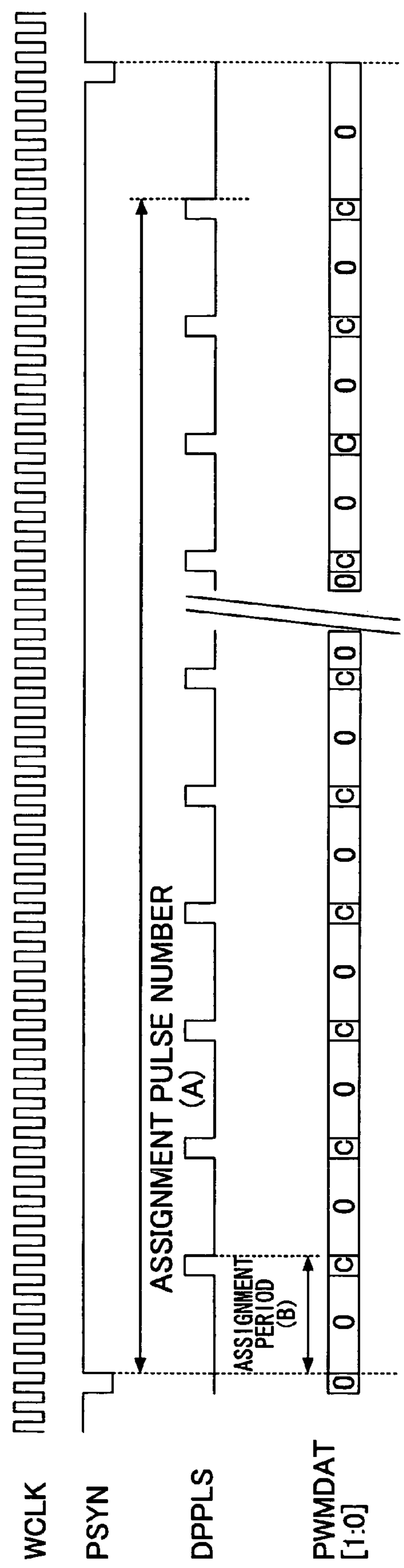
FIG. 9 shows a timing chart of PWM data control timing.

FIG. 9 shows a timing chart of PWM data control timing. As can be seen from this timing chart, when the above-mentioned internal synchronization signal PSYN is input to the PWM data control part 58, a period counter 60 shown in FIG. 7 counts the pixel clock pulses WCLK, and outputs a signal DPPLS when the count value reaches the above-mentioned assignment period B. Thereby, the period counter 60 is reset, and then, restarts counting. A pulse number counter 61 counts the DPPLS signals, and stops when the count value reaches the above-mentioned assignment pulse number A. A PWM data output part 62 outputs the input data C to the PWM data control part 58 as the data PWMDAT[1:0] when the DPPLS becomes '1'.

Thus, the PWM data control part 58 starts counting of the pixel clock pulses from a timing corresponding to a scanning start position by the internal synchronization signal PSYN. Then, the data C is output every assignment period B. As mentioned above, the data C indicates increase/reduction of the pixel clock pulse width. The PWM clock generating part 57 carries out increase/reduction of the pixel clock pulse width as mentioned above according to the data C.

Then, after the number of pixel clock pluses thus assigned to be subject to an actual increase/reduction of their pulse widths reaches the assignment pulse number A, the operation on the current main scan line is finished. Thus, on this scan line, from among all the pixel clock pulses belonging to this scan line, the assignment pulse number A of the pixel clock pulses are assigned to be subject to an actual increase/reduction of their pulse widths, at the assignment periods B.

In the present embodiment, passing time of the synchronization detecting sensors 38*bkc*, 40*bkc*, 38*ym* and 40*ym* (see FIG. 4), provided for each color, is measured as a result of the high frequency clock pulses (PLLCLK) being counted, and, a difference of the thus-obtained count value with a previously set reference count value is reflected on the assignment pulse number (A), the assignment period (B) and the data (C) so that the main scan magnification is corrected.

FIG. 10 shows a flow chart of a processing procedure of the main scan magnification correction. When the magnification correction is carried out, first the high frequency clock frequency from the PLL common for the four colors Y, M, C and K should be determined. For this purpose, when the main scan magnification correction is started, operation is carried out with the set values (M, N), i.e., the above-mentioned dividing coefficients M and N of the frequency dividing processing, stored in the preceding magnification correction operation (Step S101). In this state, PLLCLK is applied for measuring timing between the two synchronization detections of the front end and the rear end (i.e., front and rear end synchronization detections) (corresponding to 320 mm) (see FIG. 5) (Step S102). Then, the main scan magnification for each color is calculated as a ratio between a two-point synchronization reference value and the thus-obtained measured value (Step S103).

Next, an average in the main scan magnification is obtained for the respective colors (Step S104). For example, assuming that each color main scan magnification thus calculated is 105% (black); 103% (magenta); 102% (cyan); and 99% (yellow), the average is obtained as (102% +103% +105% + 99%) / 4=102.25%. In this case, the values M and N to be set in the PLL are adjusted accordingly so that the resulting high frequency clock frequency becomes 1/102. 25% of the original (Step S10 -5). As a result, the corrected main scan magnification should result as follows accordingly:

105/102.25=102.96[%] (for black);

103/102.25=100.73[%] (for magenta);

102/102.25=99.75[%] (for cyan); and

99/102.25=96.82[%] (for yellow)

The remaining differences, i.e., +2.69%, +0.73%,−0.25% and −3.18%, obtained from subtracting 100% from the above-mentioned respective values, should be then corrected in a subsequent step.

With the use of the PLLCLK thus corrected in the frequency as mentioned above, the inter-two-point synchronization detection measurement is carried out again for each color (Step S106), and therewith, the correction of the remaining differences is carried out as a result of the assignment pulse number (A), the assignment period (B) and the data (C) being set for a scan line. For example, assuming that the remaining difference for black corresponds to four counts larger than the reference value, this state means that the scan magnification is smaller than the reference value by 4/8 pixels. Therefore, in this case, the desired magnification should be obtained as a result of an increase by 4/8 pixels (see FIG. 8). For this purpose, the above-mentioned values A and B are set as A=4 and C=1, for example. A=4 means that the number of clock pulses for which the pulse width is adjusted is 4 for one scan line. Since a unit of the increase/reduction is 1/8 pixel for one clock pulse (see FIG. 8), the scan magnification can be increased by total 4/8 pixels as a result of the four clock pulses are thus assigned for being subject to the pulse width adjustment. Further, C=1 means that a pulse width adjustment mode is 'pulse width increase'.

The same as in the related art, the above-mentioned value B is determined in such a manner that the required number of pulses may be assigned within the two-point, i.e., the front and rear point synchronization detections. For the case of FIG. 5 in that, the front and rear end synchronization detection distance (L2) is 320 mm and the pixel density is 600 dpi, the value B is obtained by the following formula:

$$B=(320\text{ mm}/25.4\text{ mm}\times 600\text{ dpi})/A$$

→cutting away after the decimal point

Thus, the optimum pulse assignment intervals are set for one scan line of the front end to rear end synchronization detection distance.

For example, total 50 pulses are assigned for pulse width adjustment (A=50), as shown in FIG. 12, (1), (A) and (B), and the pixel assignment is made at 151 pixel intervals. This operation is carried out also for magenta, cyan and yellow. Thus, the magnification is corrected for each color (Steps S106 through S117).

The scan magnification for each color, once set as mentioned above, may change after that, due to a temperature distribution in the optical system included in the exposure unit 5 of FIG. 3 due to operation environment, operation time having elapsed, or such. In such a case, a relative magnification of each color with respect to a reference color (for example, black) should be adjusted for the purpose of avoiding so-called color drift. In order to correct the magnification of each color with respect to that of black for the purpose of avoiding so-called color drift, in this embodiment, the toner marks (correction patterns) 16, 17 are produced (printed) on the intermediate transfer belt 10 as shown in FIG. 5. Then, the thus-produced patterns 16, 17 are detected by the sensors **20*f* and 20*r* shown in FIG. 3 (Step S118), and thus, based on the detected results, the scan magnification is corrected to eliminate the differences from that of the reference color. As shown in FIG. 5, when a central position 18 of the respective lines 16 and 17 of the thus-produced patterns is obtained, the magnification error amount ΔLc in a sensor distance (L1**: 260 mm) is obtained by the following formulas:

$$\Delta Lc=\{(C22-C21)-(K22-K21)\}-\{(C12-C11)-(K12-K11)\}[\text{mm}]$$

Further, assuming that the main scan magnification for cyan upon production of the patterns 16, 17 is Zc (%), a required magnification correction coefficient ΔZc is obtained as follows:

$$\Delta Zc=260\text{ mm}/(260\text{ mm}+\Delta Lc)$$

The main scan magnification Zc', after the required correction, is obtained (Step S119) as follows accordingly:

$$Zc'=\Delta Zc\times Zc$$

The above-mentioned two-point-synchronization reference value is then corrected for obtaining the thus-corrected main scan magnification Z'c for a subsequent printing operation (Step S120). The same operation is carried out also for magenta and yellow.

Figure 11:
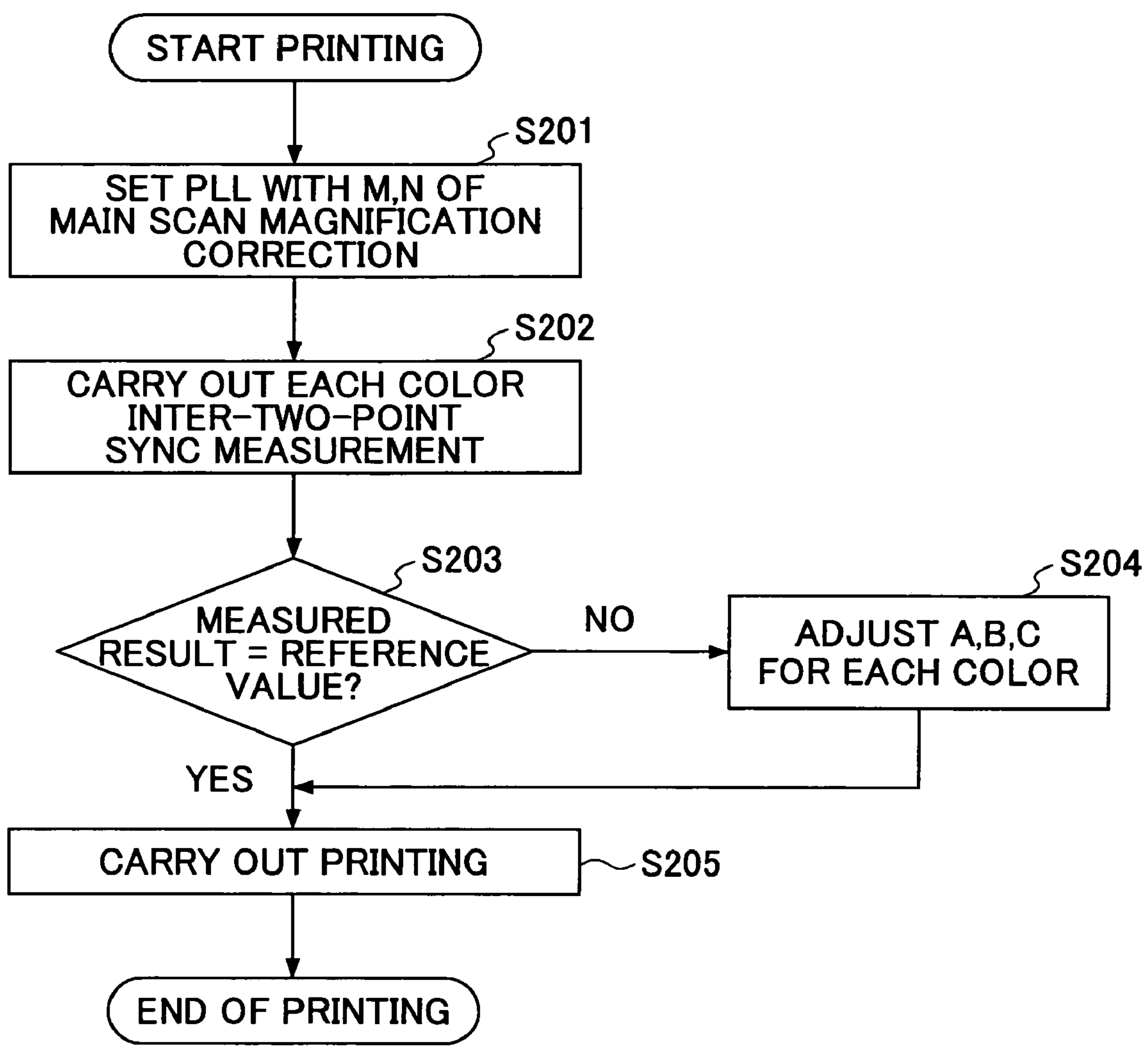
FIG. 11 shows a flow chart of pre-printing processing procedure.

Then, after that, a processing procedure shown in FIG. 11 (operation flow chart) is carried out immediately before actual image printing. Before the printing, as shown, the values M and N obtained from the main scan magnification correction operation described above with reference to FIG. 10 are set in the PLL (Step S201), the inter-two-point synchronization measurement is carried out for each color (Step S202) so that the main scan magnification correction is carried out. That is, the thus-measured inter-two-point synchronization measurement result is compared with the two-point-synchronization reference value ((Step S203), and, based on the comparison result, the assignment pulse number (A), the assignment period (B) and the data (C) are set for correcting the thus-obtained difference (Step S204). Thus, the main scan magnification correction is finished. The actual printing operation is carried out after that (Step S205).

However, when the above-mentioned measured magnification error amount ΔLc includes a measurement error, precise main scan magnification cannot be carried out.

FIG. 12 shows relationship between the assignment pulse number (A) and the assignment period (B) for correcting the main scan magnification in the plus (+) direction. FIG. 12, (1) shows relationship of the assignment period and the main scan magnification set value calculated for the front and rear end synchronization detection distance (L2: 320 mm) when the assignment pulse number of 10 through 1000 is set for example. As shown, for a range where the assignment pulse number A is small, the assignment period changes accordingly as the assignment pulse number changes (in FIG. 12, (1), the range between 10 and 50 in the assignment pulse number). However, when the assignment pulse number becomes larger, the assignment period is shortened accordingly, and as a result, in a range, the assignment period does not change even while the magnification set value changes, as shown (in FIG. 12, (1), the range between 800 and 830 in the assignment pulse number, for example).

FIG. 12, (2) shows relationship between the assignment pulse number A in a range between the front end synchronization detecting sensor and the right sensor 20*r* and the main scan magnification for the same range, for the case of the setting of FIG. 12, (1). As shown, while the assignment pulse number increases, in a range, the main scan magnification does not change (for example, the range between 800 and 830 in the assignment pulse number in (1)). As a result, a magnification error, i.e., a difference (measurement error) between the set magnification and the actual magnification obtained at the right sensor, amounts to the order of 0.2% maximum in this example.

Such a phenomenon occurs because, assignment of pulses for which pulse width is adjusted may reach a position on a scan line corresponding to the position of the right sensor 20*r* as a result of the pulse assignment being made in sequence from the left end position in the right direction for obtaining a larger required magnification correction value. Then, when the pulse assignment has reached the position corresponding to the right sensor 20*r*, an effect of a further increase/reduction the assignment number (A) is obtained merely from the position more right than the right sensor 20*r*, while no effect is obtained from the range more left than the right sensor 20*r*.

As a result, although the set magnification is obtained from the entire range between the front and rear end synchronization detections (260+30+30=320 mm), the same set magnification is not obtained from the range between the left and right sensors 20*f* and 20*r* (260 mm). If a detection result obtained from the produced toner marks 16 and 17 (see FIG. 5) in such a condition is applied to obtain a positional error, which is then applied for the main scan magnification correction, a corresponding measurement error occurs, and as a result, erroneous correction (over-correction) may be carried out. Thereby, color drift may not be corrected properly.

In order to solve this problem, according to the present embodiment, the assignment pulse number A' and the assignment period B' are obtained from the following formulas, different from those mentioned above, for the main scan magnification correction among the four colors (Y, M, C and K) with the use of the toner marks (correction patterns) 16 and 17 (or inter-color main scan magnification correction). Assuming that AL denotes the assignment pulse number between the front and rear end synchronization detections (L2: 320 mm), with the left sensor 20*f* position (30 mm) and the sensor distance (L1: 260 mm), $$A'=AL\times(30\text{ mm}+260\text{ mm})/320\text{ mm}$$

→counting fractions of 0.5 and over as a unit and cutting away the rest.

$$B'=\{(30\text{ mm}+260\text{ mm})/25.4\times600\text{ dpi}\}/A'$$

→cutting away after the decimal point

In this case, a result shown in FIG. 12, (3) is obtained. As shown, the above-mentioned measurement error in the main scan magnification hardly occurs. Thus, the proper inter-color main scan magnification correction can be carried out.

The scan magnification ('magnification at right sensor' in FIG. 12, (3)) up to the right sensor 20*r* is obtained from the following formula:

$$[\{(A')\times(25.4[\text{mm}]/600[\text{dpi}])/8\}+(260[\text{mm}]+30[\text{mm}])]/(260[\text{mm}]+30[\text{mm}])$$

The scan magnification ('magnification at right sensor' in FIG. 12, (2)) up to the right sensor 20*r*, for the case where the original A is applied, is obtained from a formula, obtained from replacement of the value of A' with the value of A.

Similarly, the scan magnification ('set magnification' in FIG. 12, (1)) in the entire scanning range between the front and rear end synchronization detections is obtained from the following formula:

$$[\{(A)\times(25.4[\text{mm}]/600[\text{dpi}])/8\}+(260[\text{mm}]+30[\text{mm}]+30[\text{mm}])]/(260[\text{mm}]+30[\text{mm}]+30[\text{mm}])$$

Thus, according to the present embodiment, the assignment pulse number (A) and the assignment period (B) are changed between for image printing and for inter-color main scan magnification correction with the use of the correction patterns. That is, upon positional error detection with the use of the correction patterns 16, 17 for the inter-color main scan magnification correction, the assignment pulse number and the assignment period are set in such a manner that the set magnification may be obtained from the correction patterns 16, 17 in particular from the range up to the right sensor 20*r* (see FIG. 5). In contrast thereto, for actual image printing, the assignment pulse number and the assignment period are set in such a manner that the set magnification may be obtained in particular from the range between the front end to rear end synchronization detections (320 mm). As a result, the main scan magnification error occurring at the right sensor 20*r* position can be effectively reduced. Thus, the inter-color main scan magnification correction accuracy can be improved. As a result, even when a large number of pixel clock pulses (beyond the position corresponding to the right sensor 20*r*) are assigned to be subject to pulse width adjustment (to have periods different from the reference period) for the main scan magnification correction, highly accurate main scan magnification correction can be carried out.

Next, a second embodiment of the present invention is described.

The second embodiment is different from the above-described first embodiment only in a configuration of the PWM data control part 58 shown in FIG. 7. Only the contents different from the first embodiment will now be described, where the same reference numerals denote the same or corresponding parts, respectively.

Figure 13:
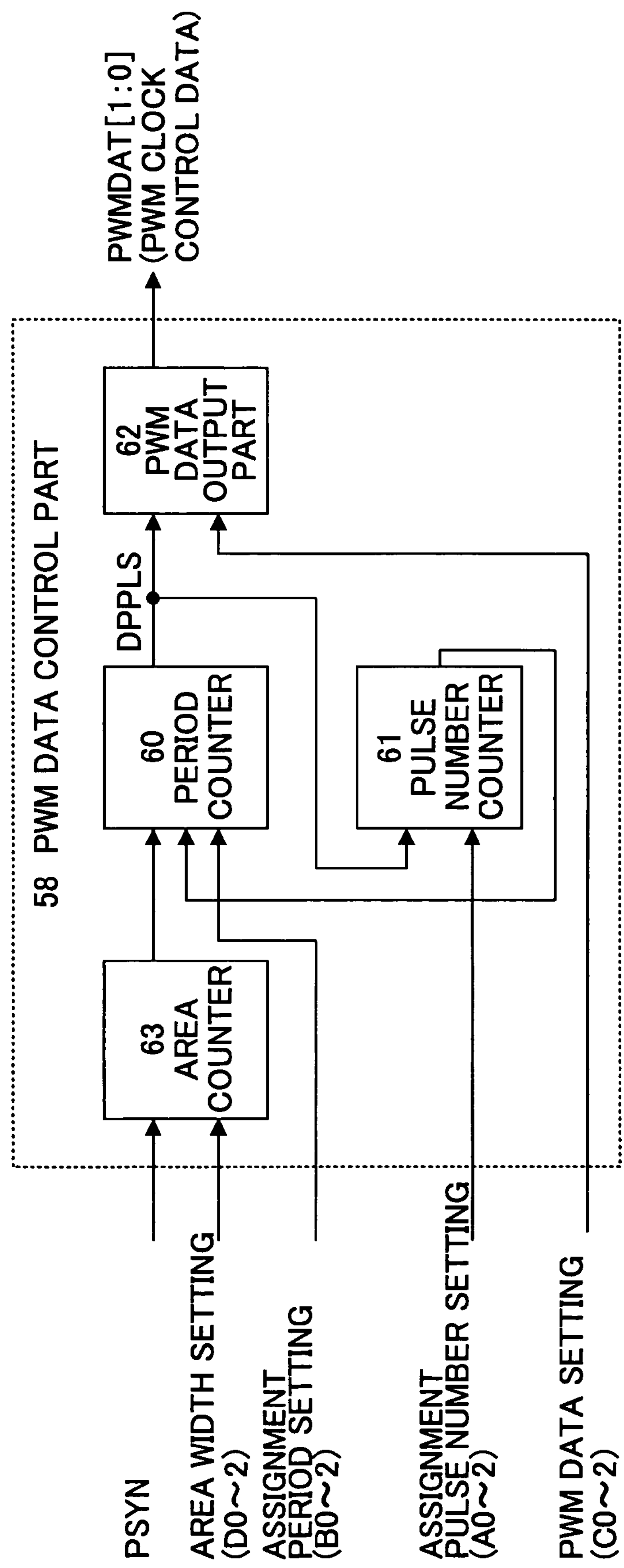
FIG. 13 shows a block diagram of a PWM data control part according to a second embodiment of the present invention.

FIG. 13 shows a block diagram of a PWM data control part 58 according to the second embodiment of the present invention. In this figure, an area counter 63 has the internal synchronization signal PSYN input thereto. Then, the area counter 63 outputs an area signal corresponding to an area range setting value D0 through D2, corresponding to areas 0 through 2, mentioned below, to a period counter 60.

Figure 14:
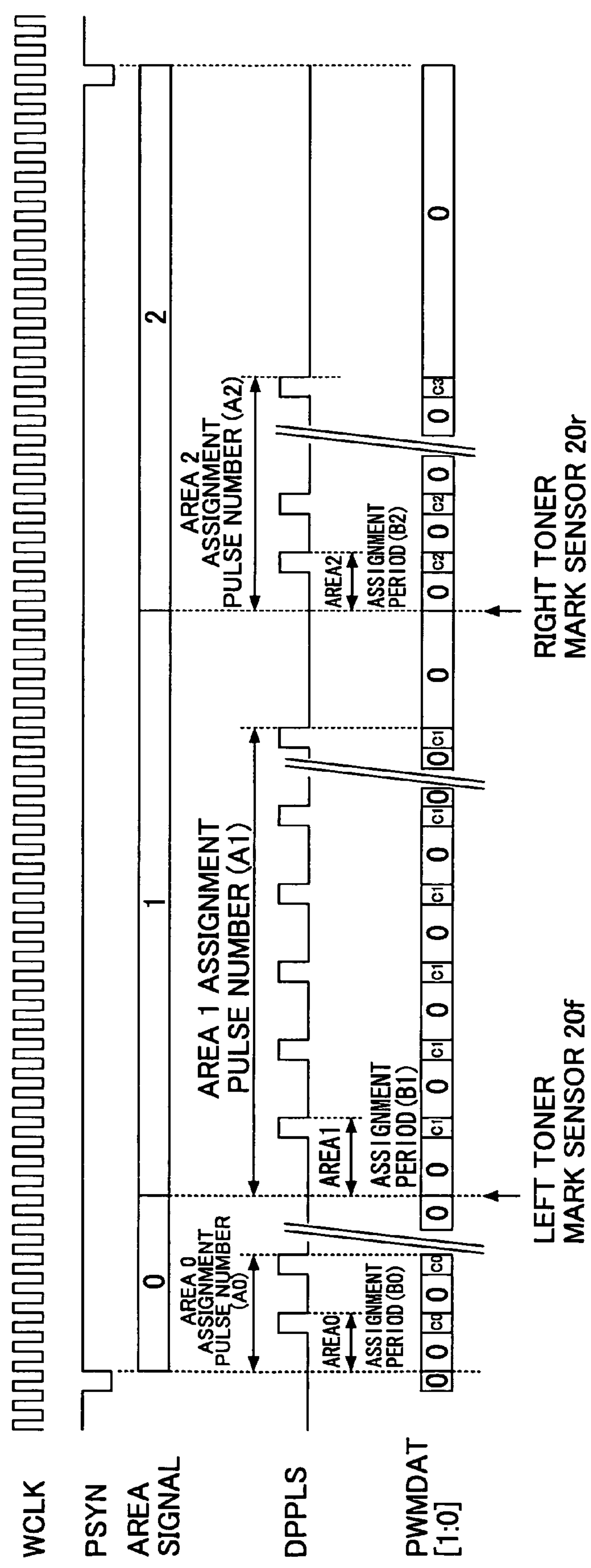
FIG. 14 shows a timing chart of PWM data control timing according to the second embodiment of the present invention.

FIG. 14 shows a timing chart of PWM data control timing. In this example, one scan line is divided into the area 0 between positions corresponding to the front end synchronization detecting point and the toner mark sensor 20*f*; the area 1 between positions corresponding to the left toner mark sensor 20*f* and the right toner mark sensor 20*r*; and the area 2 between positions corresponding to the right toner mark sensor 20*r* and the rear end synchronization detecting point. As shown in FIG. 14, the period counter 60 and a pulse number counter 61 operate in the same way as those in the above-described first embodiment, according to set values of assignment pulse number (A0 through A2) and assignment period (B0 through B2), corresponding to a respective one of these three areas.

According to the above-described first embodiment, a measurement error in the main scan magnification can be effectively reduced at the position of the right sensor 20*r* upon production of the correction patterns (toner marks) 16, 17. However, as shown in FIG. 15, (3), an error still occurs in some amount at the position of the left sensor 20*f* in the first embodiment. In contrast thereto, according to the second embodiment, the assignment pulse number (A) and the assignment period (B) can be set in different values between both sides of the sensor 20*f* or 20*r*. As a result, the error at the left sensor 20*f* can also be effectively reduced, as shown in FIG. 15, (4). These assignment pulse numbers A0 through A2 and the assignment periods B0 through B2 can be obtained from the following formulas:

$A0=AL\times(30\text{ mm})/320\text{ mm}$

→counting fractions of 0.5 and over as a unit and cutting away the rest.

$B0=(30\text{ mm}/25.4\text{ mm}\times600\text{ dpi})/A0$

→cutting away after the decimal point $A1=AL\times(30\text{ mm}+260\text{ mm})/320\text{ mm}-A0$ →counting fractions of 0.5 and over as a unit and cutting away the rest.

$B1=(260\text{ mm}/25.4\text{ mm}\times600\text{ dpi})/AL$

→cutting away after the decimal point $A2=AL-(A0+A1)$

→counting fractions of 0.5 and over as a unit and cutting away the rest.

$B2=(30\text{ mm}/25.4\text{ mm}\times600\text{ dpi})/A2$

→cutting away after the decimal

By configuring so, the set values should not be changed between for image printing operation and for toner mark pattern production for inter-color main scan magnification correction.

The other parts of the second embodiment are configured in the same way as those of the first embodiment, and operate in the same way.

Thus, according to the second embodiment, the assignment pulse number (A) and the assignment period (B) can be set in any values different between both sides of each of the toner mark sensors 20*f* and 20*r*. As a result, a measurement error in the main scan magnification at the left sensor 20*f* position can also be reduced effectively. Thus, the inter-color main scan magnification correction can be carried out further accurately. Further, since the assignment pulse numbers (A) and the assignment periods (B) can be applied in common between for image printing and for toner mark (correction pattern) production, different from the first embodiment, control can be made easier in this term.

Each of the above-described embodiments may be embodied also in a form of a program.

In this case, a program may be-produced to include instructions for causing a computer (i.e., the system controller 630 shown in FIG. 2) to carry out control of the full-color copier described above with reference to FIGS. 5 through 15. Then, this program may be stored in the ROM 604 of FIG. 2. Then, the CPU 605 reads each instruction therefrom, and executes it in sequence. As a result, corresponding operation is carried out thereby, so that the control functions of the full-color copier, described above with reference to FIGS. 5 through 15, can be executed.

The above-mentioned program may be downloaded in the hard disk derive (HDDC) 650 of FIG. 2 or such from the management server via the communication network such as the LAN in the example of FIG. 2. Also in this case, the CPU 605 reads each instruction of the program thus stored in the hared disk drive, and executes it in sequence. As a result, corresponding operation is carried out thereby, so that the control functions of the copier, described above with reference to FIGS. 5 through 15, may be executed.

Further, the present invention is not limited to the above-described embodiments, and variations and modifications may be made without departing from the basic concept of the present invention claimed below.

The present application is based on Japanese Priority Applications Nos. 2005-016153 and 2006-002651, filed on Jan. 24, 2005 and Jan. 10, 2006, respectively, the entire contents of which are hereby incorporated herein by reference.

What is claimed is:

1. An image forming apparatus for obtaining an image by scanning with modulated light modulated in timing of a predetermined timing signal base on input image information, comprising:

a part of adjusting, upon predetermined mark image measurement, the timing signal, for obtaining a required correction amount for a scan magnification of the modulated light, in particular in a measurement range of the predetermined mark image measurement;

a part of adjusting, upon regular image forming operation, the timing signal, for obtaining the required correction amount for the scan magnification of the modulated light, in particular in the entire scanning range of the modulated light for regular image forming operation;

a first adjusting part measuring the scan magnification of the modulated light, obtaining the required correction amount of the scan magnification of the modulated light by comparing the measured value with a reference value, and adjusting the timing signal with the required correction amount of the scan magnification of the modulated light, in prior to actual image forming operation; and a second adjusting part forming a predetermined mark image with the use of the predetermined timing signal having undergone the adjustment by said first adjusting part and measuring the predetermined mark image, correcting the required correction amount for the scan magnification of the modulated light, by comparing the measured value with a reference value; and further adjusting the timing signal, wherein:

upon the predetermined mark image forming operation, the timing signal is adjusted in such a manner that the required correction amount for the scan magnification of the modulated light may be obtained in particular in the measurement range of the predetermined mark measurement; and upon the regular image forming operation, the timing signal is adjusted in such a manner that the required correction amount for the scan magnification of the modulated light may be obtained in particular in the predetermined scanning range of the modulated light for the regular image forming operation.

2. An image forming apparatus for obtaining an image by scanning with modulated light modulated in timing of a predetermined timing signal base on input image information, comprising:

a part of adjusting, upon predetermined mark image measurement, the timing signal, for obtaining a required correction amount for a scan magnification of the modulated light, in particular in a measurement range of the predetermined mark image measurement;

a part of adjusting, upon regular image forming operation, the timing signal, for obtaining the required correction amount for the scan magnification of the modulated light, in particular in the entire scanning range of the modulated light for regular image forming operation, wherein:

the adjustment of the timing signal is made by changing, in a predetermined manner, a pulse width of each of predetermined clock pulses from among clock pulses corresponding to the predetermined modulated light scanning range; and said predetermined clock pulses are determined from a total number of clock pulses for which the pulse width should be adjusted and a frequency of the clock pulses for which the pulse width is adjusted.

3. The image forming apparatus as claimed in claim 2, wherein:

the predetermined manner for changing the pulse width of each of the predetermined clock pulses comprises a manner such that the pulse width is increased or decreased by a predetermined amount.

4. The image forming apparatus as claimed in claim 2, wherein:

the predetermined clock pulses are assigned at the frequency in sequence in a predetermined direction along the predetermined modulated light scanning range.

5. The image forming apparatus as claimed in claim 4, wherein:

in order to obtain the required correction amount for the scan magnification of the modulated light in particular in the mark image measurement range, the total number of clock pulses, for each of which the pulse width is adjusted, for obtaining the correction amount for the scan magnification of the modulated light upon the regular image forming apparatus, is multiplied with a ratio of the mark image measurement range with respect to the predetermined scanning range for the regular image forming operation, and the thus-obtained value is applied as the number of clock pulses, for each of which the pulse width is adjusted.

6. The image forming apparatus as claimed in claim 1, wherein:

the measurement of the scan magnification of the modulated light is made by measurement of scanning timing of the modulated light by photosensors set in the modulated light scanning range.

7. The image forming apparatus as claimed in claim 1, wherein:

the predetermined mark image comprises a first mark image extending in a main scan direction which is a direction in which the modulated light scans and a second mark image extending in a direction inclined from the main scan direction by a predetermined angle.

8. The image forming apparatus as claimed in claim 1, wherein:

a plurality of optical systems are applied to scan with the modulated light to form a plurality of color component images, respectively, and a multi-color image is obtained from overlaying the plurality of color component images.

9. The image forming apparatus as claimed in claim 8, wherein:

the plurality of color component images are formed on respective image carriers, and are transferred to an intermediate transfer member in sequence in an overlaying manner, and thus, the multi-color image is obtained.

10. The image forming apparatus as claimed in claim 8, wherein:

a common PLL is applied to grenade respective timing signals for the modulated light for forming the respective ones of the plurality of color component images.

11. The image forming apparatus as claimed in claim 1, wherein:

clock pulses of the timing signal for the modulated light correspond to pixels of the image obtained from scanning with the modulated light.

* * * * *